US012774741B2

(12) United States Patent
Han et al.

(10) Patent No.: US 12,774,741 B2
(45) Date of Patent: Oct. 27, 2026

(54) GEARBOX AND VEHICLE

(71) Applicant: CHERY AUTOMOBILE CO., LTD., Wuhu (CN)

(72) Inventors: Yanyan Han, Wuhu (CN); Zhiguang Zhou, Wuhu (CN); Yuanlong Ye, Wuhu (CN); Shenglin Gan, Wuhu (CN); Qixin Dong, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 0 days.

(21) Appl. No.: 19/133,855

(22) PCT Filed: May 24, 2024

(86) PCT No.: PCT/CN2024/095239
§ 371 (c)(1),
(2) Date: May 29, 2025

(87) PCT Pub. No.: WO2025/066206
PCT Pub. Date: Apr. 3, 2025

(65) Prior Publication Data

US 2026/0194134 A1 Jul. 9, 2026

(30) Foreign Application Priority Data

Sep. 26, 2023 (CN) ......................... 202311251533.2

(51) Int. Cl.
*F16H 57/04* (2010.01)

(52) U.S. Cl.
CPC ..... *F16H 57/0443* (2013.01); *F16H 57/0409* (2013.01); *F16H 57/0424* (2013.01); *F16H 57/0457* (2013.01); *F16H 57/0436* (2013.01)

(58) Field of Classification Search
CPC ............. F16H 57/0409; F16H 57/0424; F16H 57/0443; F16H 57/0457
See application file for complete search history.

(56) References Cited

U.S. PATENT DOCUMENTS

| | | | | |
|---|---|---|---|---|
| 3,529,698 | A | 9/1970 | Nelson | |
| 9,746,068 | B2 * | 8/2017 | Tahara | F16H 57/045 |

(Continued)

FOREIGN PATENT DOCUMENTS

| | | | |
|---|---|---|---|
| CN | 105179650 | A | 12/2015 |
| CN | 212203048 | U | 12/2020 |

(Continued)

OTHER PUBLICATIONS

International Search Report and Written Opinion of the International Searching Authority from the European Patent Office, in PCT/CN2024/095239 dated Sep. 1, 2024, of which this application is a national phase entry.

*Primary Examiner* — Minh Truong
(74) *Attorney, Agent, or Firm* — Kolitch Romano Dascenzo Gates LLP

(57) ABSTRACT

Provided is a gearbox. The gearbox includes: a casing, a differential gear, and an oil reservoir; wherein the differential gear and the oil reservoir are disposed within the casing, and the oil reservoir is disposed above the differential gear; and the oil reservoir has an open end and a closed end opposite to the open end, wherein the open end is away from the differential gear, and the closed end has an oil drainage structure, an oil drainage rate of the oil drainage structure in an uphill condition being greater than an oil drainage rate of the drainage structure in a level road condition.

18 Claims, 3 Drawing Sheets

(56) References Cited

U.S. PATENT DOCUMENTS

| | | | | |
|---|---|---|---|---|
| 2010/0319486 | A1 | 12/2010 | Kawamoto et al. | |
| 2016/0153546 | A1* | 6/2016 | Ogawa ................ | F16H 57/0457 74/665 F |
| 2019/0145509 | A1* | 5/2019 | Yu ....................... | F16H 57/0421 184/11.1 |
| 2022/0282783 | A1* | 9/2022 | Nakata ................ | F16H 57/0423 |

FOREIGN PATENT DOCUMENTS

| | | | | | |
|---|---|---|---|---|---|
| CN | 112943908 | A | * | 6/2021 | ........... F16H 57/045 |
| CN | 113124141 | A | | 7/2021 | |
| CN | 113154019 | A | | 7/2021 | |
| CN | 113932003 | A | | 1/2022 | |
| CN | 215720744 | A | | 2/2022 | |
| CN | 216507742 | A | | 5/2022 | |
| CN | 114763834 | A | | 7/2022 | |
| CN | 117249229 | A | | 12/2023 | |
| DE | 10254572 | A1 | * | 3/2004 | ......... F16H 57/0447 |
| DE | 102015223566 | A1 | | 6/2017 | |
| DE | 102023107622 | A1 | * | 10/2024 | ......... F16H 57/0495 |
| EP | 3537007 | A1 | * | 9/2019 | ......... F16H 57/0457 |
| FR | 2744508 | A1 | | 8/1997 | |
| JP | 2000337485 | A | | 12/2000 | |
| JP | 2004036633 | A | | 2/2004 | |
| JP | 2005083491 | A | * | 3/2005 | ......... F16H 57/0447 |
| JP | 2007315456 | A | | 12/2007 | |
| JP | 2007321927 | A | | 12/2007 | |
| JP | 2011158069 | A | | 8/2011 | |
| JP | 2013167296 | A | | 8/2013 | |
| JP | 2019108931 | A | | 7/2019 | |
| SU | 411256 | A1 | | 1/1974 | |
| WO | WO2011126440 | A1 | | 10/2011 | |
| WO | WO-2023188618 | A1 | * | 10/2023 | ............... B60K 1/00 |

* cited by examiner

PRIOR ART

GEARBOX AND VEHICLE

This application is a U.S. national stage of international application No. PCT/CN2024/095239, filed on May 24, 2024, which claims priority to Chinese Patent Application No. 202311251533.2, filed on Sep. 26, 2023 and entitled "GEARBOX AND VEHICLE", the content of which is incorporated herein by reference in their entireties.

TECHNICAL FIELD

The present disclosure relates to the field of vehicle technology, and in particular, to a gearbox and a vehicle.

BACKGROUND

With the increasingly stringent requirements for energy conservation and emission reduction, a rising interest is placed on the research and development of energy-saving vehicles. Due to prominent advantages in energy efficiency and environmental protection, hybrid vehicles have attracted widespread interest in their development and research. As one of the key parts of hybrid vehicles, gearboxes are facing increasing cooling requirements.

SUMMARY

Embodiments of the present disclosure provide a gearbox and a vehicle. The technical solutions are as follows.

Embodiments of the present disclosure provide a gearbox. The gearbox includes: a casing, a differential gear and an oil reservoir, wherein the differential gear and the oil reservoir are disposed within the casing, and the oil reservoir is disposed above the differential gear; and the oil reservoir has an open end and a closed end opposite to the open end, the open end is away from the differential gear, and the closed end has an oil drainage structure, an oil drainage rate of the oil drainage structure in an uphill condition being greater than the oil drainage rate of the drainage structure in a level road condition.

In some embodiments of the present disclosure, the oil drainage structure includes a first oil hole and a second oil hole, wherein the second oil hole and the first oil hole are spaced apart sequentially on the closed end in a forward direction of a vehicle, and the first oil hole is below the second oil hole in a vertical direction, an oil drainage rate of the first oil hole being less than an oil drainage rate of the second oil hole.

In some embodiments of the present disclosure, a diameter of the first oil hole is smaller than a diameter of the second oil hole; or the oil drainage structure further includes two electronically controllable valves, wherein the two electronically controllable valves are disposed in the first oil hole and the second oil hole respectively.

In some embodiments of the present disclosure, at least a portion of an end surface of the closed end is an oil drainage surface, the first oil hole and the second oil hole are disposed in the oil drainage surface, a second angle is defined between the oil drainage surface and a horizontal plane in level road condition, the second angle is not greater than a maximum of a first angle, and the first angle is defined between a bottom surface of the casing and the horizontal plane.

In some embodiments of the present disclosure, the first oil hole is disposed in a region, closest to the bottom surface of the casing, of the oil drainage surface, and the second oil hole is disposed in a region, farthest from the bottom surface of the casing, of the oil drainage surface.

In some embodiments of the present disclosure, the open end has an expanded portion, the expanded portion extends in a direction away from an inner cavity of the oil reservoir, a collection groove is disposed in a side, away from the differential gear, of the expanded portion, and the collection groove is communicated with the inner cavity of the oil reservoir.

In some embodiments of the present disclosure, the expanded portion is a flange surrounding the inner cavity of the oil reservoir.

In some embodiments of the present disclosure, a third angle is defined between a side, away from the differential gear, of the expanded portion and a side where the open end is disposed, wherein the third angle is greater than 90°.

In some embodiments of the present disclosure, the gearbox further includes a pump device, wherein the pump device is disposed within the casing, and the pump device includes a valve body and an oil pump; wherein a suction port of the oil pump is close to a bottom surface of the casing, an oil outlet port of the oil pump is communicated with an oil inlet port of the valve body, and the valve body has a plurality of oil outlet ports for delivering lubricating oil to components in the gearbox.

In some embodiments of the present disclosure, the pump device further includes a filter screen, wherein the filter screen is disposed in an oil path between the oil outlet port of the oil pump and the oil inlet port of the valve body.

Embodiments of the present disclosure provide a vehicle. The vehicle includes the gearbox as described above.

BRIEF DESCRIPTION OF THE DRAWINGS

For clearer descriptions of the technical solutions according to the embodiments of the present disclosure, the following briefly introduces the accompanying drawings required for describing the embodiments. Apparently, the accompanying drawings in the following description show merely some examples of the present disclosure, and those of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are further described in detail below with reference to the accompanying drawings.

Unless otherwise defined, technical or scientific terms used herein shall have the ordinary meaning as understood by those of ordinary skill in the art to which the present disclosure belongs. Terms "first," "second," "third," and the like, as used in the specification and in the claims of the patent application of the present disclosure, do not indicate any order, quantity, or importance, but are merely defined to distinguish different components. Likewise, singular forms "a," "an," and "the" are intended to include the plural forms as well, unless the context clearly indicates otherwise. Terms "include," "comprise," or derivatives thereof, when used in this specification, specify the presence of stated features, integers, steps, operations, elements, and/or components, but do not preclude the presence or addition of one or more other features, integers, steps, operations, elements, components, and/or groups thereof. Terms "connecting," "connected," or other similar words are not limited to physical or mechanical connections, but may include electrical connections, whether direct or indirect. Terms "up," "down," "left,", "right," "top," "bottom," and the like are merely defined to indicate relative positional relationships. In the case that the absolute position of a described object changes, the relative position relationship may also change accordingly.

In the related art, a gearbox is mainly cooled by oil. Specifically, differential gears churn the oil at the bottom of the gearbox, and the coil is thus caused to splash onto gears and drive shafts. As such, cooling and lubrication of the gears and the drive shafts in the gearbox are implemented.

Under various operating conditions such as climbing uphill, the vehicle posture may present larger loads on the gearbox, and therefore, an excessive amount of oil is typically pumped into the bottom of the gearbox to satisfy the cooling requirements. This results in a relatively large amount of oil remaining in the gearbox under other low-load operating conditions, e.g., when the gearbox operates on a level surface or on a gentle slope. The more oil there is, the more the differential gears are immersed in the oil, such that a large amount of oil is churned by the differential gears in motion, and churning losses are increased.

Figure 1:
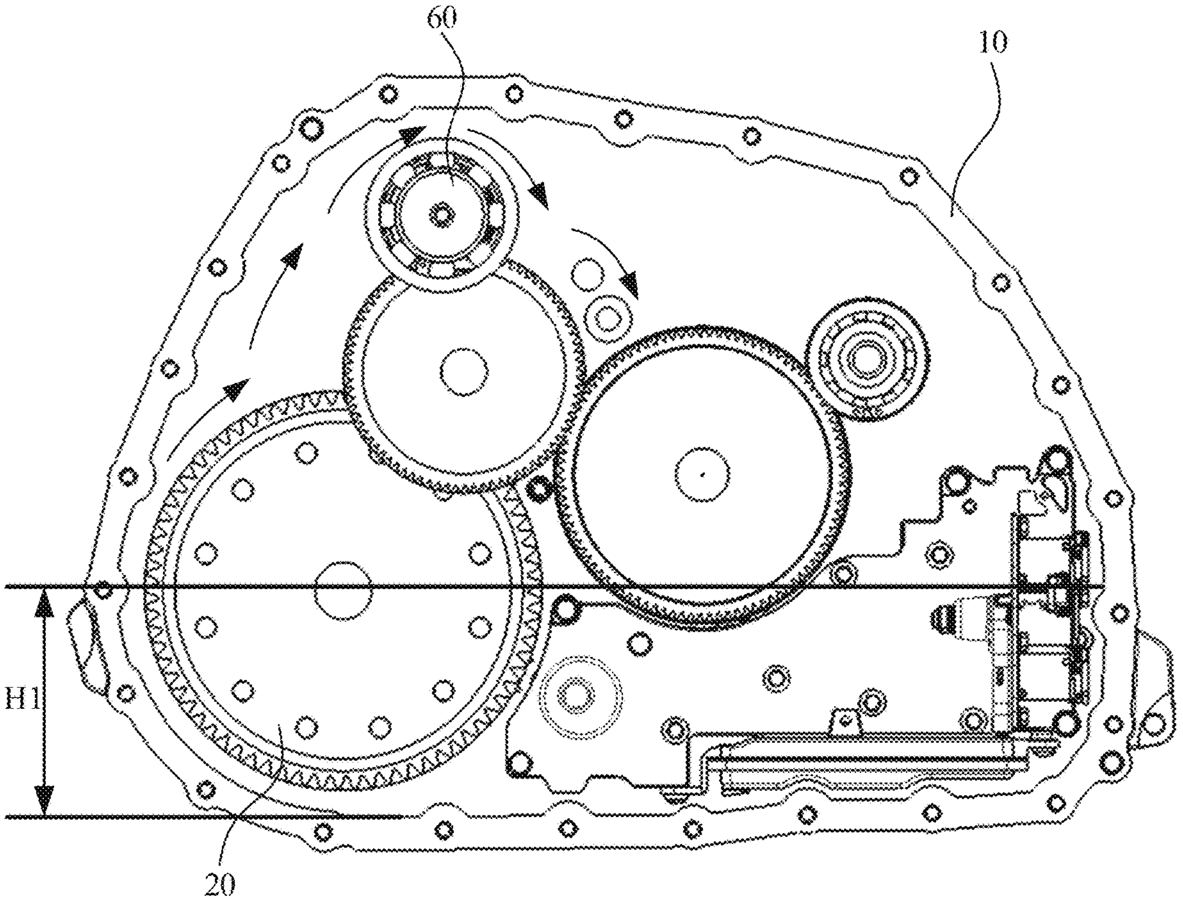
FIG. 1 is a schematic structural diagram of a gearbox according to the related art.

FIG. 1 is a schematic structural diagram of a gearbox according to the related art. As shown in FIG. 1, the gearbox includes: a casing 10, a differential gear 20, and a transmission mechanism 60. The differential gear 20 and the transmission mechanism 60 are disposed within the casing 10, and the transmission mechanism 60 includes a gear and a transmission shaft that is assembled with the gear.

FIG. 1 illustrates the flow direction of the splashed oil in the gearbox of a vehicle under a level road condition. As shown in FIG. 1, oil is provided at the bottom of the casing 10, and the height of the oil is H1. The differential gear 20 is partially immersed in the oil, the oil is centrifugally thrown with the rotation of the differential gear 20, and the path of the thrown oil is shown by the arrows in FIG. 1. Under the action of the throwing and the gravity of the oil, the oil falls to the transmission shafts and gears, and the oil lubricates and cools the gears and transmission shafts.

Under various operating conditions such as climbing uphill, the vehicle posture may present larger loads on the gearbox, and therefore, an excessive amount of oil is typically pumped into the bottom of the gearbox to satisfy the cooling requirements. This results in a relatively large amount of oil remaining in the gearbox under other low-load operating conditions, e.g., when the gearbox operates on a level road or on a slightly sloping road. The more oil there is, the more the differential gears 20 are immersed in the oil, such that a large amount of oil is churned by the differential gears 20 in motion, and churning losses are increased.

Figure 2:
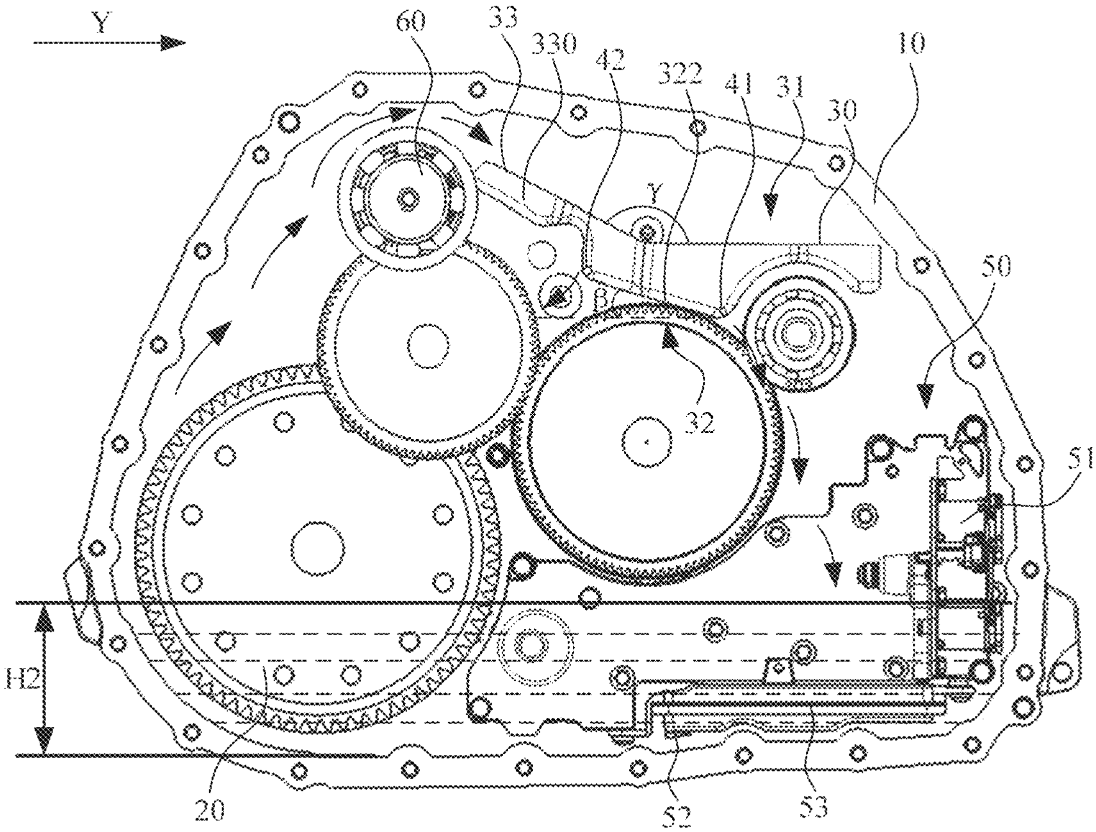
FIG. 2 is a schematic structural diagram of a gearbox according to some embodiments of the present disclosure.

In this way, embodiments of the present disclosure provide a gearbox. FIG. 2 is a schematic structural diagram of a gearbox according to some embodiments of the present disclosure. As shown in FIG. 2, the gearbox includes a casing 10, a differential gear 20, and an oil reservoir 30, wherein the differential gear 20 and the oil reservoir 30 are disposed within the casing 10, and the oil reservoir 30 is disposed above the differential gear 20.

The oil reservoir 30 being disposed above the differential gear 20 indicates that in the vertical direction, the oil reservoir 30 is disposed above the differential gear 20.

As shown in FIG. 2, the oil reservoir 30 has an open end 31 and a closed end 32 opposite to the open end 31, the open end 31 is away from the differential gear 20, and the closed end 32 has an oil drainage structure.

The oil drainage rate of the oil drainage structure in an uphill condition is greater than the oil drainage rate of the drainage structure in a level road condition.

In some embodiments of the present disclosure, the level road condition refers to a condition of the vehicle driving on a level road, and the uphill condition refers to a condition of the vehicle driving uphill.

The gearbox in the embodiments of the present disclosure includes the casing 10, the differential gear 20, and the oil reservoir 30 disposed within the casing 10. The oil reservoir 30 is disposed above the differential gear 20 in the vertical direction, and an open end 31 of the oil reservoir 30 is away from the differential gear 20.

Referring to the oil delivery path shown by the arrows in FIG. 2, during the process of the differential gear 20 churning the oil at the bottom of the gearbox, the splashed oil falls from the open end 31 into the oil reservoir 30 to be gathered in the oil reservoir 30.

In the embodiments of the present disclosure, the oil drainage structure is disposed at the closed end of the oil reservoir, and the oil drainage rate of the oil drainage structure in the uphill condition is greater than the oil drainage rate of the oil drainage structure in the level road condition. Therefore, in the case that the gearbox is operated in an uphill condition with a large load, the oil in the oil reservoir flows out rapidly, such that more oil is retained at the bottom of the gearbox to satisfy the cooling requirement. In the case that the gearbox is operated in a level road condition with a small load, the oil drainage rate of the oil in the oil reservoir is slower, such that some of the oil is retained in the oil reservoir and a smaller amount of oil is retained at the bottom of the gearbox, which reduces the churning losses.

FIG. 2 illustrates the flow direction of the splash oil of the gearbox pf a vehicle under a level road condition. As shown in FIG. 2, the first angle between the bottom surface of the casing 10 and the horizontal plane is 0 or small in the case that the gearbox operates under a low-load condition. In this way, the oil drainage rate of the oil drainage structure is also small, and the oil in the oil reservoir 30 flows slowly, such that some of the oil is retained in the oil reservoir 30, and the bottom of the gearbox retains a smaller amount of oil. Referring to FIG. 2, the height of the oil at the bottom of the casing 10 is H2, which reduces the churning losses.

Figure 3:
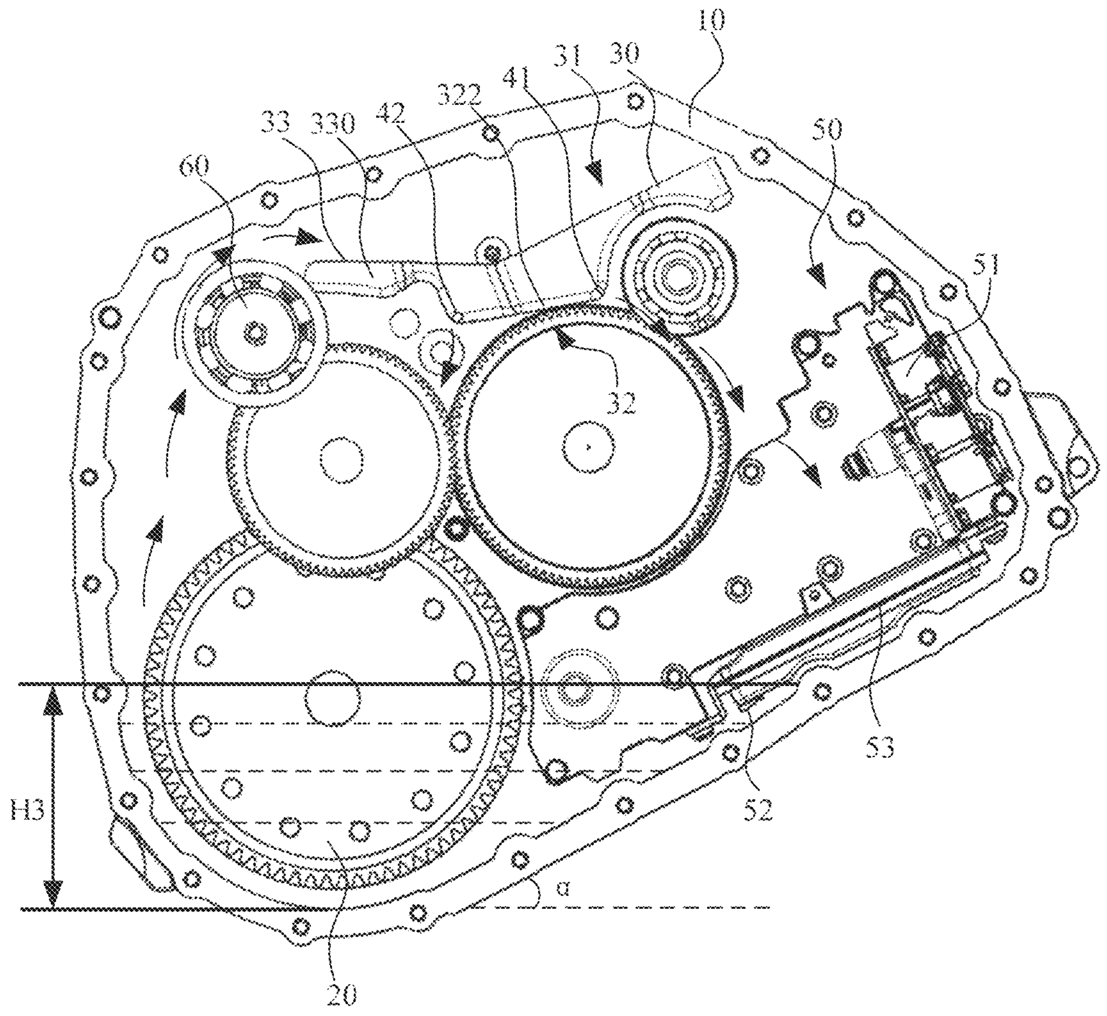
FIG. 3 is a schematic structural diagram of a gearbox according to some embodiments of the present disclosure.

FIG. 3 is a schematic structural diagram of a gearbox according to some embodiments of the present disclosure. FIG. 3 illustrates the flow direction of the splash oil in the gearbox of a vehicle in an uphill condition. As shown in FIG. 3, in the case that the gearbox operates in a loaded condition such as uphill, a first angle $\alpha$ is present between the bottom surface of the casing 10 and the horizontal plane. The oil drainage rate of the oil drainage structure in the uphill condition is greater than the oil drainage rate in the level road condition, such that the oil in the oil reservoir 30 flows out quickly, and a greater amount of oil is retained at the bottom of the gearbox. Referring to FIG. 3, the height of the oil at the bottom of the casing 10 is H3, wherein H3>H2, such that a greater portion of the differential gear 20 is immersed in the oil to satisfy the cooling requirement.

Optionally, as shown in FIGS. 2 and 3, the oil drainage structure includes a first oil hole 41 and a second oil hole 42.

For example, the diameter of the first oil hole 41 needs to be small enough, such that the oil drainage rate of the first oil hole 41 is less than the oil throwing rate of the differential gear 20.

The oil throwing rate of the differential gear 20 is the amount of oil per unit of time that the oil is splashed into the oil reservoir 30 under the churn of the differential gear 20.

In this way, the oil drainage rate of the first oil hole 41 is less than the oil throwing rate of the differential gear 20, which ensures that a certain amount of oil is stored in the oil reservoir 30 under the working condition with a small load, thereby reducing the total amount of oil in the casing 10, decreasing the height of the oil at the bottom of the casing 10, and reducing the churning losses.

For example, the diameter of the second oil hole 42 needs to be larger than the diameter of the first oil hole 41, such that the oil drainage rate of the second oil hole 42 is greater than the oil throwing rate of the differential gear 20, and the oil drainage rate of the second oil hole 42 needs to satisfy that the oil in the oil reservoir 30 can flow out rapidly into the casing 10 under the working condition with a large load.

Under the operating condition with a large load, the oil in the oil reservoir 30 flowing out rapidly into the casing 10 indicates that within 1 s to 5 s, the oil in the oil reservoir 30 completely flows out into the casing 10.

In this way, the oil drainage rate of the second oil hole 42 is greater than the oil throwing rate of the differential gear 20, which ensures that under the condition with a large load, the oil in the oil reservoir 30 can flow out rapidly, such that the bottom of the gearbox retains a larger amount of oil to satisfy the cooling requirement.

As shown in FIG. 2, in the forward direction of the vehicle (see the Y direction in FIG. 2), the second oil holes 42 and the first oil holes 41 are spaced apart sequentially on the closed end 32. In the vertical direction, the first oil hole 41 is below the second oil hole 42, and the oil drainage rate of the first oil hole 41 is smaller than the oil drainage rate of the second oil hole 42.

In the above implementation, the second oil hole 42 is disposed at the upper left side of the first oil hole 41, and in the case that the vehicle is in a level road condition, because the oil throwing rate of the differential gear 20 is greater than the oil drainage rate of the first oil hole 41, the oil is gradually retained in the oil reservoir 30 upon being thrown into the oil reservoir 30, until the height of the oil in the oil reservoir 30 is equal to the height of the second oil hole 41. In the case that the height of the oil rises to the height of the second oil hole 42, the oil exceeding the height of the second oil hole 41 flows rapidly out of the oil reservoir 30 into the casing 10 because the oil throwing rate of the differential gear 20 is less than the oil drainage rate of the second oil hole 42. In this way, under level road conditions, the amount of oil entering the oil reservoir 30 is constant, and because the total amount of oil in the gearbox remains constant, the oil at the bottom of the casing is reduced, thereby decreasing the height of the oil at the bottom of the casing 10 and reducing the churning losses.

In the case that the vehicle is in an uphill condition, i.e., the gearbox is tilted relative to a horizontal plane, the position of the second oil hole 42 is lowered and the position of the first oil hole 41 is raised. In the case that the position of the second oil hole 42 is at the same height as the position of the first oil hole 41, or the position of the second oil hole 42 is lower than the position of the first oil hole 41, the oil that enters the oil reservoir 30 flows through the second oil hole 42. Because the oil drainage rate of the second oil hole 42 is greater than the oil throwing rate of the differential gear 20, the oil in the oil reservoir 30 flows out rapidly, and more oil is retained at the bottom of the casing to satisfy the cooling requirement.

For example, the diameter of the first oil hole 41 is not greater than 3 mm. For example, the diameter of the first oil hole 41 is 2 mm.

For example, the diameter of the second oil hole 42 is not less than 10 mm. For example, the diameter of the second oil hole 42 is 12 mm.

In one implementation, the first oil holes 41 are a plurality of holes, and the plurality of first oil holes 41 are spaced apart at the closed end 32 of the oil reservoir 30. The second oil holes 42 are a plurality of holes, and the plurality of second oil holes 42 are spaced apart at the closed end 32 of the oil reservoir 30.

The distribution density of the first oil holes 41 may be less than the distribution density of the second oil holes 42. The distribution density refers to the quantity of oil holes distributed per unit area.

By providing the second oil holes 42 with a greater distribution density, the oil drainage area of the second oil holes 42 is increased, and the oil flows through the second oil holes 42 rapidly.

In another implementation, the first oil hole 41 is one. The second oil holes 42 are a plurality holes, and the plurality of second oil holes 42 are spaced apart at the closed end 32 of the oil reservoir 30.

By providing the plurality of second oil holes 42, the oil drainage area of the second oil holes 42 is increased, such that the oil can flow through the second oil holes 42 rapidly.

In some implementations, the oil drainage structure includes the first oil hole 41, the second oil hole 42, and two electronically controllable valves, and the two electronically controllable valves are mounted in the first oil hole 41 and the second oil hole 42 respectively.

In this way, during use, in the case that the vehicle is in a level road condition, the openings of the electronically controllable valves controlling the first oil hole and the second oil hole become smaller, thereby reducing the oil drainage rate of the oil holes, i.e., decreasing the oil drainage rate. In the case that the vehicle is in an uphill condition, the openings of the electronically controllable valves controlling the first oil hole and the second oil hole become larger, thereby increasing the oil drainage rate of the oil hole, i.e., increasing the oil drainage rate, such that the gearbox has sufficient oil therein for lubrication and cooling under a large load condition, and the case has a moderate amount of oil under a small load condition to avoid churning losses.

Optionally, as shown in FIG. 2, at least a portion of the end surface of the closed end 32 is an oil drainage surface 322, the first oil hole 41 and the second oil hole 42 are disposed in the oil drainage surface 322, a second angle $\beta$ is between the oil drainage surface 322 and the horizontal plane, the second angle $\beta$ is not greater than the maximum value of the first angle $\alpha$, and the first angle $\alpha$ is the angle between the bottom surface of the casing 10 and the horizontal plane.

In the above implementations, by arranging the oil drainage surface 322 of the closed end 32 having the first oil hole 41 and the second oil hole 42 as a sloped surface, and arranging the first oil hole 41 and the second oil hole 42 on the oil drainage surface 322, the purpose of arranging the second oil hole 42 to be on the upper left side of the first oil hole 41 is achieved.

The maximum angle of the first angle may be the angle between the horizontal plane and a slope at a maximum angle at which the vehicle can be driven.

For example, the maximum value of the first angle may be 45°, i.e. the second angle $\beta$ is less than or equal to 45°.

In this way, in the case that the vehicle is driven on the slope with the maximum angle, the oil drainage surface 322 is rotated to a nearly horizontal orientation, such that the oil in the oil reservoir 30 flows away directly through the second oil hole 42.

In the embodiments of the present disclosure, in the case that the first angle ranges from 0 to 21.8°, the oil in the oil reservoir only submerges the first oil hole, the oil flows into the casing through the first oil hole, and the oil drainage rate of the first oil hole is less than the oil throwing rate of the differential gear. The oil is gradually retained in the oil reservoir 30 upon being thrown into the oil reservoir 30, which reduces the oil at the bottom of the casing, thereby reducing the churning losses of the differential gear.

In the case that the first angle is greater than 21.8°, the oil in the oil reservoir submerges the second oil hole, and the oil flows into the casing at a maximum oil drainage rate only through the second oil hole.

Optionally, as shown in FIG. 2, the first oil hole 41 is within a region, closest to the bottom surface of the casing 10, of the oil drainage surface 322, and the second oil hole 42 is within a region, farthest from the bottom surface of the casing 10, of the oil drainage surface 322.

The first oil hole 41 and the second oil hole 42 are thus disposed on the opposite sides of the oil drainage surface 322, such that the first oil hole 41 is disposed at the junction of the oil drainage surface 322 and the bottom surface of the oil reservoir 30, and the second oil hole 42 is disposed at the junction of the oil drainage surface 322 and the side wall of the oil reservoir 30. Because the junction of the two surfaces tends to collect oil, the oil hole at the junction of the surfaces enables the oil to flow easily to the oil hole, thereby facilitating the oil drainage in the oil reservoir 30.

Optionally, as shown in FIG. 2, the open end 31 has an expanded portion 33, the expanded portion 33 extends in a direction away from the inner cavity of the oil reservoir 30, a collection groove 330 is disposed on the side, away from the differential gear 20, of the expanded portion 33, and the collection groove 330 is communicated with the inner cavity of the oil reservoir 30.

By providing the expanded portion 33, the area of the oil reservoir 30 for collecting the splashed oil is enlarged, such that the oil reservoir 30 can collect the splashed oil more easily. The collection groove 330 is disposed on the surface of the expanded portion 33, the collection groove 330 being communicated with the inner cavity of the oil reservoir 30, such that the oil collected by the expanded portion 33 is gathered into the inner cavity of the oil reservoir 30 for subsequent flowing from the inner cavity of the oil reservoir 30 into the casing 10.

For example, the expanded portion 33 may be a flange surrounding the oil reservoir 30.

In this way, the flange extending outwardly surrounding the open end 31 can substantially increase the area of the oil reservoir 30 to collect splashed oil, making it easier for the oil reservoir 30 to collect the splashed oil.

Optionally, as shown in FIG. 2, a third angle γ is between a side, away from the differential gear 20, of the expanded portion 33 and the side where the open end 31 is disposed, wherein the third angle γ is greater than 90°.

In the above implementation, the expanded portion 33 is disposed to be inclined to the side where the open end 31 is disposed, such that the oil splashed into the collection groove 330 of the expanded portion 33 can flow down the inclined surface into the oil reservoir 30.

For example, the third angle γ between the side, away from the differential gear 20, of the expanded portion 33 and the side where the open end 31 is disposed is 130°.

In the embodiments of the present disclosure, the oil thrown by the differential gear is a non-pressurized oil, and the non-pressurized oil is mainly configured to lubricate the shafts and gears within the gearbox. However, the lubrication and cooling of other transmission devices within the gearbox, for example, clutches and synchronizers, require an oil pump to deliver the pressurized oil.

The differential gear and the oil pump are typically operated simultaneously to cause the shafts, gears, and devices within the transmission to be lubricated and cooled.

In some implementations, an oil pump and a valve are also disposed within the gearbox, the suction port of the oil pump absorbs the oil from the bottom of the casing and delivers the oil to the valve, and the oil is delivered to the devices, such as clutches and synchronizers, through different oil ports in the valve for lubrication and cooling of the devices.

Optionally, as shown in FIG. 2, the gearbox further includes a pump device 50, which is disposed within the casing 10. The pump device 50 includes a valve body 51 and an oil pump, and the valve body 51 and the oil pump have an integral structure.

For example, as shown in FIG. 2, the pump device 50 is disposed at a junction of a bottom surface and a side wall of the casing, and the pump device is disposed at a corner position, such that the pump device does not occupy the installation space of other devices. Moreover, in the forward direction Y of the vehicle, the pump device 50 is disposed in front of the differential gear 20.

The pump device 50 is an integrated structure formed by integrating the valve body 51 and the oil pump together, such that integrating a plurality of components can effectively reduce the space occupied by the valve body 51 and the oil pump in the gearbox.

As shown in FIG. 2, a suction port 52 of the oil pump is close to the bottom surface of the casing 10, an oil outlet port of the oil pump is communicated with an oil inlet port of the valve body 51, and the valve body 51 has a plurality of oil outlet ports for delivering lubricating oil to the components in the gearbox.

For example, the oil outlet ports may be communicated via pipes with areas of the synchronizer and clutch that require lubrication.

By arranging the suction port 52 of the oil pump of the integrated pump device 50 closer to the bottom surface of the casing 10, it is favorable for the oil pump to suck oil from the casing 10 and avoid the problem of empty suction.

As shown in FIGS. 2 and 3, in the case that the gearbox changes from a level road condition to an uphill condition, the oil in the casing 10 is gathered in the lower left corner of the box body 10. This leaves a portion of the bottom surface of the casing 10 uncovered by oil.

In some embodiments of the present disclosure, the placement of the suction port 52 of the oil pump needs to satisfy that the oil liquid can submerge the suction port 52 of the oil pump in the case that the gearbox is in an uphill working condition, thereby preventing the oil pump from empty suction and enhancing safety.

Optionally, as shown in FIGS. 2 and 3, the pump device 50 further includes a filter screen 53, which is disposed in the oil path between the oil outlet port of the oil pump and the oil inlet port of the valve body 51.

The valve body 51 has a collection cavity, the suction port 52 of the oil pump is disposed on a side wall of the collection cavity and penetrates the side wall of the collection cavity. The filter screen 53 is disposed in the collection cavity and separates the collection cavity into two cavities, and the suction port 52 of the oil pump is disposed in one of the cavities.

In the above implementation, the valve body 51 is provided with a collection cavity, and the suction port 52 of the oil pump is disposed in the collection cavity for pumping the oil in the casing 10 of the gearbox into the collection cavity. The filter screen 53 is also disposed in the collection cavity, and the filter screen 53 can filter large particles, and the cleaner oil is filtered from one cavity to the other, such that the oil pump can pump the oil into the valve body 51, and the oil is pumped by the valve body 51 to each device in the gearbox to achieve all-round lubrication and cooling.

The oil cooling processes of the gearbox according to the embodiments of the present disclosure under different working conditions are as follows.

As shown in FIG. 2, the gearbox is in the working condition with a small load on the level road, the height of the oil in the casing 10 is H2, the differential gear 20 is partially immersed in the oil, the oil is centrifugally thrown with the rotation of the differential gear 20, the path of the thrown oil is shown by the arrows in FIG. 2, and under the action of the throwing, the oil enters the oil reservoir 30.

The first oil hole 41 and second oil hole 42 are disposed in the oil reservoir 30, and the oil in the oil reservoir 30 flows through the first oil hole 41 to the input shaft and gears due to the gravity, as shown by the right arrow in FIG. 2. Because the gearbox is not tilted under level road conditions, very little oil flows out from the second oil hole 42. As the differential gear 20 rotates, the oil in the oil reservoir 30 fills up and reaches a dynamic balance, and the temperature of the oil in the oil reservoir 30 is kept dynamically consistent with the temperature of the oil in the casing 10.

Under the working condition with a small load on the level road, the height H2 of the oil in the casing 10 is lower than the height H1 of the oil in FIG. 1, because a portion of the oil is stored in the oil reservoir 30. The region of the differential gear 20 immersed in the oil is also less compared to the region in FIG. 1, therefore, the differential gear 20 throws less oil, which results in the mechanical efficiency of the gearbox in the present application being better than the gearbox shown in FIG. 1.

As shown in FIG. 3, the gearbox is in the working condition with a large load on the extreme slope, due to the changes in gearbox conditions, the suction port of the oil pump is the extreme suction boundary, the height of the oil in the casing 10 in FIG. 3 is H3, and the suction port of the oil pump is just below the oil in this condition. The oil height H3 in this condition is the limit oil height. The differential gear 20 is immersed in the oil, and the oil is centrifugally thrown with the rotation of the differential gear 20, and the oil throwing path is shown by the left arrow in FIG. 3. Under the action of throwing, the oil enters the oil reservoir 30. The oil in the oil reservoir 30 under this extreme slope condition returns rapidly to the casing 10 via the second oil hole 42, as shown by the right arrow in FIG. 3. A less amount of oil in the oil reservoir 30 rapidly flows through the edge of the expanded portion 33 of the oil reservoir 30 and the input shaft and the gears back into the casing 10, as shown by the middle arrow in FIG. 3, such that the oil is not in the oil reservoir 30, and the oil returns to the casing 10 rapidly.

The gearbox according to the embodiments of the present disclosure, under the non-harsh slope conditions of the vehicle (level road, small slope uphill or downhill conditions), the oil is splashed into the oil reservoir 30 through the rotation of the differential gear 20 to reduce the height of the oil in the casing 10 and reduce the churning losses of the gearbox. The oil reservoir 30 lubricates the axle teeth through the dynamic oil flow port, such that the oil in the oil reservoir 30 is in flow and reaches a dynamic balance rapidly to ensure that the temperature of the oil in the oil reservoir 30 is consistent with the temperature of the oil in the hybrid gearbox. In the case that the vehicle is under a severe slope condition (slow climbing condition), the oil in the oil reservoir 30 is reduced based on the slope of the vehicle until no oil is in the oil reservoir 30 under the extreme severe slope, such that the oil suction requirement of oil pump under the extreme severe slope is satisfied. In the case that the vehicle needs to instantly reach the extreme severe slope, the oil in the oil reservoir 30 instantly flows out, such that the height of the oil at the bottom of the casing 10 is rapidly increased, the oil suction requirement of the suction port of the oil pump is satisfied, and empty suction is prevented.

Embodiments of the present disclosure further provide a vehicle including the gearbox as described above.

The above description does not limit the present disclosure in any way. Although the present disclosure has been described as above through the embodiments, they are not intended to limit the present disclosure. Those skilled in the art are able to make some changes or modifications to the above disclosed technical contents to give equivalent embodiments of equivalent changes without departing from the scope of the present disclosure. However, any simple alterations, equivalent changes and modifications made, without departing from the contents of the technical solutions of the present disclosure, on the above embodiments based on the technical essence of present disclosure shall fall within the scope of the technical solutions of the present disclosure.

The invention claimed is:

1. A gearbox, comprising:

a casing, a differential gear, and an oil reservoir;

wherein the differential gear and the oil reservoir are disposed within the casing, and the oil reservoir is disposed above the differential gear; and wherein the oil reservoir has an open end and a closed end opposite to the open end, wherein the open end is facing away from the differential gear and is configured to catch oil splashed up by the differential gear, and the closed end has an oil drainage structure, wherein the oil drainage structure is configured such that an oil drainage rate of the oil drainage structure in an uphill condition is greater than an oil drainage rate of the oil drainage structure in a level road condition, wherein the oil drainage structure comprises a first oil hole and a second oil hole, wherein the second oil hole and the first oil hole are spaced apart sequentially on the closed end in a forward direction of a vehicle, and the first oil hole is below the second oil hole in a vertical direction, an oil drainage rate of the first oil hole being less than an oil drainage rate of the second oil hole.

2. The gearbox according to claim 1, wherein a diameter of the first oil hole is smaller than a diameter of the second oil hole; or the oil drainage structure further comprises two electronically controllable valves, wherein the two electronically controllable valves are disposed in the first oil hole and the second oil hole respectively.

3. The gearbox according to claim 1, wherein at least a portion of an end surface of the closed end is an oil drainage surface, the first oil hole and the second oil hole are disposed in the oil drainage surface, a second angle is defined between the oil drainage surface and a horizontal plane in level road condition, the second angle is not greater than a maximum of a first angle, and the first angle is defined between a bottom surface of the casing and the horizontal plane in the uphill condition.

4. The gearbox according to claim 3, wherein the first oil hole is disposed in a region, closest to the bottom surface of the casing, of the oil drainage surface, and the second oil hole is disposed in a region, farthest from the bottom surface of the box, of the oil drainage surface.

5. The gearbox according to claim 1, wherein the open end has an expanded portion, the expanded portion extends in a direction away from an inner cavity of the oil reservoir, a collection groove is disposed in a side, away from the differential gear, of the expanded portion, and the collection groove is communicated with the inner cavity of the oil reservoir.

6. The gearbox according to claim 5, wherein the expanded portion is a flange surrounding the inner cavity of the oil reservoir.

7. The gearbox according to claim 5, wherein a third angle is defined between a side, away from the differential gear, of the expanded portion and a side where the open end is disposed, wherein the third angle is greater than 90°.

8. The gearbox according to claim 1, further comprising: a pump device, wherein the pump device is disposed within the casing, and the pump device comprises a valve body and an oil pump;

wherein a suction port of the oil pump is close to a bottom surface of the casing, an oil outlet port of the oil pump is communicated with an oil inlet port of the valve body, and the valve body has a plurality of oil outlet ports for delivering lubricating oil to components in the gearbox.

9. The gearbox according to claim 8, wherein the pump device further comprises a filter screen.

10. A vehicle, comprising a gearbox, wherein the gearbox comprises:

a casing, a differential gear, and an oil reservoir;

wherein the differential gear and the oil reservoir are disposed within the casing, and the oil reservoir is disposed above the differential gear; and wherein the oil reservoir has an open end and a closed end opposite to the open end, wherein the open end is facing away from the differential gear and is configured to catch oil splashed up by the differential gear, and the closed end has an oil drainage structure, wherein the oil drainage structure is configured such that an oil drainage rate of the oil drainage structure in an uphill condition is greater than an oil drainage rate of the oil drainage structure in a level road condition, wherein the oil drainage structure comprises a first oil hole and a second oil hole, wherein the second oil hole and the first oil hole are spaced apart sequentially on the closed end in a forward direction of a vehicle, and the first oil hole is below the second oil hole in a vertical direction, an oil drainage rate of the first oil hole being less than an oil drainage rate of second oil hole.

11. The vehicle according to claim 10, wherein a diameter of the first oil hole is smaller than a diameter of the second oil hole; or the oil drainage structure further comprises two electronically controllable valves, wherein the two electronically controllable valves are disposed in the first oil hole and the second oil hole respectively.

12. The vehicle according to claim 10, wherein at least a portion of an end surface of the closed end is an oil drainage surface, the first oil hole and the second oil hole are disposed in the oil drainage surface, a second angle is defined between the oil drainage surface and a horizontal plane in level road condition, the second angle is not greater than a maximum of a first angle, and the first angle is defined between a bottom surface of the casing and the horizontal plane in the uphill condition.

13. The vehicle according to claim 12, wherein the first oil hole is disposed in a region, closest to the bottom surface of the casing, of the oil drainage surface, and the second oil hole is disposed in a region, farthest from the bottom surface of the box, of the oil drainage surface.

14. The vehicle according to claim 10, wherein the open end has an expanded portion, the expanded portion extends in a direction away from an inner cavity of the oil reservoir, a collection groove is disposed in a side, away from the differential gear, of the expanded portion, and the collection groove is communicated with the inner cavity of the oil reservoir.

15. The vehicle according to claim 14, wherein the expanded portion is a flange surrounding the inner cavity of the oil reservoir.

16. The vehicle according to claim 14, wherein a third angle is defined between a side, away from the differential gear, of the expanded portion and a side where the open end is disposed, wherein the third angle is greater than 90°.

17. The vehicle according to claim 10, wherein the gearbox further comprises: a pump device, wherein the pump device is disposed within the casing, and the pump device comprises a valve body and an oil pump;

wherein a suction port of the oil pump is close to a bottom surface of the casing, an oil outlet port of the oil pump is communicated with an oil inlet port of the valve body, and the valve body has a plurality of oil outlet ports for delivering lubricating oil to components in the gearbox.

18. The vehicle according to claim 17, wherein the pump device further comprises a filter screen.

* * * * *